United States Patent
Rege et al.

(10) Patent No.: US 9,660,676 B2
(45) Date of Patent: May 23, 2017

(54) METHODS AND APPARATUS FOR REDUCING INTERFERENCE EFFECT ON DATA TRANSMITTED OVER A COMMUNICATION CHANNEL

(71) Applicant: Alcatel-Lucent USA Inc., Murray Hill, NJ (US)

(72) Inventors: Kiran M. Rege, Marlboro, NJ (US); Krishna Balachandran, Morganville, NJ (US); Joseph H. Kang, Belle Mead, NJ (US); Kemal M. Karakayali, Hoboken, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 17 days.

(21) Appl. No.: 13/853,629

(22) Filed: Mar. 29, 2013

(65) Prior Publication Data
US 2014/0294126 A1    Oct. 2, 2014

(51) Int. Cl.
*H04B 1/10*     (2006.01)
*H04L 25/497*   (2006.01)

(52) U.S. Cl.
CPC .......... *H04B 1/10* (2013.01); *H04L 25/4975* (2013.01)

(58) Field of Classification Search
None
See application file for complete search history.

(56) References Cited

U.S. PATENT DOCUMENTS

| | | | |
|---|---|---|---|
| 7,653,153 B2 * | 1/2010 | Tosato | H04L 25/022 375/341 |
| 8,238,471 B2 | 8/2012 | Hwang et al. | |
| 8,320,432 B1 | 11/2012 | Chockalingam et al. | |
| 2002/0097703 A1 * | 7/2002 | Nieczyporowicz | H01Q 1/246 370/342 |
| 2004/0194004 A1 * | 9/2004 | Betts | H04L 1/006 714/792 |
| 2008/0225970 A1 * | 9/2008 | Kim | H04B 7/0417 375/260 |
| 2009/0323840 A1 | 12/2009 | Lee et al. | |
| 2010/0279729 A1 | 11/2010 | Hui et al. | |
| 2013/0170533 A1 | 7/2013 | Khojastepour et al. | |

OTHER PUBLICATIONS

Costa, Writing on Dirty Paper; IEEE Transaction on Information theory, May 1983, pp. 439-441, IEEE.*

(Continued)

*Primary Examiner* — Wednel Cadeau
(74) *Attorney, Agent, or Firm* — Harness, Dickey & Pierce, P.L.C.

(57) ABSTRACT

In one example embodiment, a method for reducing an effect of an interference signal on data being transmitted over a communication channel includes determining, by a processor, a code word based on at least an information vector and an interference vector, the information vector representing the data, the interference vector representing the interference signal. The method further includes determining, by the processor, a code vector based on the determined code word. The method further includes generating, by the processor, a transmit vector based on the code vector and the interference vector.

17 Claims, 10 Drawing Sheets

(56) References Cited

OTHER PUBLICATIONS

Erez, U. and ten Brink, S., "A Close-to-Capacity Dirty Paper Coding Scheme," *IEEE Transactions on Information Theory*, vol. 51, No. 10, 2005.
Gallager, R.G., *Low-Density Parity-Check Codes*, MIT Press, Cambridge, MA, 1963.
MacKay, D.J.C., and Neal, R.M., "Near Shannon Limit Performance of Low Density Parity Check Codes," *Electronic Letters*, vol. 32, pp. 1645-1646, Aug. 1996.
Costa, M.H.M., "Writing on Dirty Paper", IEEE Trans. on Information Theory, vol. 29, No. 3, May 1983.
Forney, G.D., "Coset Codes—Part I: Introduction and Geometrical Classification", IEEE Trans. on Information Theory, vol. 34, No. 5, Sep. 1988.
Ungerboeck, G., "Trellis-Coded Modulation with Redundant Signal Sets Part I: Introduction", IEEE Communications Magazine, vol. 25, No. 2, Feb. 1987.
Office Action for corresponding U.S. Appl. No. 13/853,630 dated Jun. 19, 2014.
Office Action for corresponding U.S. Appl. No. 14/026,581 dated Jan. 2, 2015.
Peel, "On Dirty-Paper Coding" Lecture Notes, IEEE Signal Processing Magazine, pp. 112-113 (May 2003).

\* cited by examiner

METHODS AND APPARATUS FOR REDUCING INTERFERENCE EFFECT ON DATA TRANSMITTED OVER A COMMUNICATION CHANNEL

BACKGROUND

In a conventional communication system, when a signal carrying a certain number of information bits representing data is transmitted to a receiving device over a communication channel, the signal is contaminated by channel noise and/or interference from another signal, which may be referred to as an interference signal. If the signal is to be successfully received at the receiving device in the presence of noise as well as the interference signal, the transmit signal has to be strong enough to overcome both the noise and the interference.

Conventional communication systems simply transmit the transmit signal at a power level that is high enough to overcome the noise as well as the interference signal. However, an increase of signal power may be wasteful. Another proposed solution is based on vector modulation in order to implement what is known as Dirty Paper Coding (DPC).

DPC provides, in theory, that if an interference signal known to the transmitter non-causally, it is possible to devise an encoding scheme that can deliver the desired signal to the intended receiver as efficiently, in terms of the power required to achieve error-free delivery, as in the case where the interference signal does not exist. In other words, DPC provides that in a communication channel with a constraint on the transmit energy and in which the received signal is corrupted by channel noise as well as an interference signal, non-causally known to the transmitter, it is possible to construct a coding scheme such that the error performance of the system would be similar to the error performance of the system in the absence of the interference signal.

SUMMARY

Some embodiments relate to methods and apparatuses for reducing an effect of an interference signal on data being transmitted over a communication channel. The reduction of the effect of the interference signal is achieved by determining a code vector such that the code vector is the closest vector to the interference vector. A transmit vector is then constructed by, for example, subtracting the interference vector from the code vector. The transmit vector is then communicated over the communication channel to be received by a receiving device.

In one example embodiment, a method for reducing an effect of an interference signal on data being transmitted over a communication channel includes determining, by a processor, a code word based on at least an information vector and an interference vector, the information vector representing the data, the interference vector representing the interference signal. The method further includes determining, by the processor, a code vector based on the determined code word. The method further includes generating, by the processor, a transmit vector based on the code vector and the interference vector.

In yet another example embodiment, the determining the code vector includes mapping entries of the code word to a sequence of signal points of a signal constellation.

In yet another example embodiment, the determining the code word includes determining a sum of a base code word associated with the information vector and an auxiliary code word.

In yet another example embodiment, the method includes determining, from among possible auxiliary vectors, the auxiliary vector such that when the sum of the auxiliary code word and the base code word is mapped to the sequence of signal points, the resulting code vector is the closest vector to the interference vector compared to possible code vectors obtainable by mapping a sum of the base code word and auxiliary code words associated with the possible auxiliary vectors to sequences of signal points.

In yet another example embodiment, the information vector and the auxiliary vector are code words belonging to a linear block code and the determining the code word further includes identifying the auxiliary vector using a constrained decoder that compares a difference between the interference vector and possible code vectors obtainable by mapping the sum of the base code word and the auxiliary code words associated with the possible auxiliary vectors to sequences of signal points.

In yet another example embodiment, the linear block code is a convolutional code and the constrained decoder is a constrained Viterbi decoder.

In yet another example embodiment, the signal constellation is associated with at least one of a Pulse Amplitude Modulation (PAM) system and a Quadrature Amplitude Modulation (QAM) system.

In yet another example embodiment, the mapping is carried out according to Gray Coding.

In yet another example embodiment, the generating the transmit vector further includes subtracting the interference vector from the code vector.

In one example embodiment, a method for estimating data transmitted over a communication channel includes receiving, at a processor, a vector associated with a code vector transmitted over the communication channel, the code vector being based on an information vector and an interference vector, the information vector representing the data, the interference vector representing an interference signal affecting the data communicated over the communication channel. The method further includes determining, by the processor, the code vector from among possible code vectors, such that the code vector is the closest to the received vector compared to possible code vectors, the determined code vector representing an estimate of the information vector.

In yet another example embodiment, the determining the code vector includes de-mapping the received vector to determine a vector of soft decision metrics and feeding the vector of soft decision metrics into an unconstrained decoder to determine the code vector.

In yet another example embodiment, the receiving device receives information related to an encoding scheme used for encoding the data at an encoding device prior to the signal being transmitted, the received information including at least an indication of a number of signal points of a signal constellation used in constructing the transmitted signal, wherein the information is received via a separate control channel.

In one example embodiment, an encoding device includes a processor for reducing an effect of an interference signal on data transmitted over a communication channel. The processor is configured to determine a code word based on at least an information vector and an interference vector, the information vector representing the data, the interference vector representing the interference signal. The processor is further configured to determine a code vector based on the determined code word. The processor is further configured to generate a transmit vector based on the code vector and the interference vector.

In yet another example embodiment, the processor is further configured to determine the code vector by mapping entries of the code word to a sequence of signal points within a signal constellation.

In yet another example embodiment, the processor is further configured to determine the code word by determining a sum of a base code word associated with the information vector and an auxiliary code word.

In yet another example embodiment, the processor is further configured to determine, from among possible auxiliary vectors, the auxiliary vector such that when the sum of the auxiliary code word and the base code word is mapped to the sequence of signal points, the resulting code vector is the closest vector to the interference vector compared to possible code vectors obtainable by mapping a sum of the base code word and auxiliary code words associated with the possible auxiliary vectors to sequences of signal points.

In yet another example embodiment, the information vector and the auxiliary vector are code words belonging to a linear block code and the processor is further configured to determine the code word by identifying the auxiliary vector using a constrained decoder that compares a difference between the interference vector and possible code vectors obtainable by mapping the sum of the base code word and the auxiliary code words associated with the possible auxiliary vectors to sequences of signal points.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
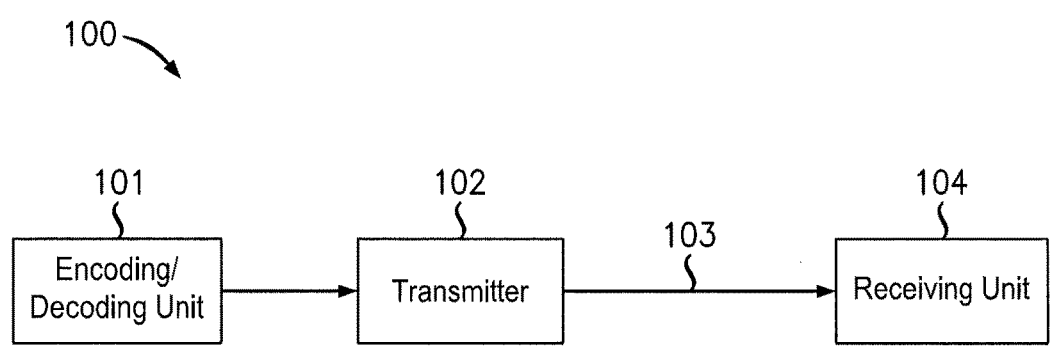
FIG. 1 depicts a communication system, in which an example embodiment for reducing interference signal effect is implemented.

Various embodiments will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This disclosure may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected,' or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Devices (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory content. Information, arguments, parameters, data, etc. may be passed, forwarded, or transmitted via any suitable means including memory sharing, message passing, token passing, network transmission, etc.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and $3^{rd}$ Generation Partnership Project LTE (3GPP LTE).

While there have been attempts to construct encoding schemes to implement dirty paper coding, none have found practical applications, mainly because of the complexity associated with such methods. Another reason that implementation of DPC has not been successful is that efforts have been mainly directed towards construction schemes that are aimed at getting close to the promised channel capacity, which typically required highly complex encoding schemes.

FIG. 1 depicts a communication system, in which an example embodiment for reducing interference signal effect is implemented. The communication system 100 includes an encoding device 101, a transmitter 102, a communication channel 103 and a receiving device 104. The communication system 100 may be any type of system in which a transmitting device communicates data to a receiving device. For example, such a system may be a cellular network employing a base station. The structure and the operation of the encoding device 101 will be further described with reference to FIGS. 2-5. The transmitter 102 may be any one of, but not limited to, a base station of a cellular network, a transmitter in a device communicating with a base station, etc. The device may be any one of, but not limited to, a cellular telephone, a laptop computer, a tablet computer, etc. The communication channel 103 may be a wired or a wireless communication channel between the transmitter 102 and the receiving device 104. Similar to the transmitter 102, the receiving device 104 may be any one of, but not limited to, a base station of a cellular network, a receiver in a device communicating with a base station, etc. The device may be any one of, but not limited to, a cellular telephone, a laptop computer, a tablet computer, etc.

Figure 2:
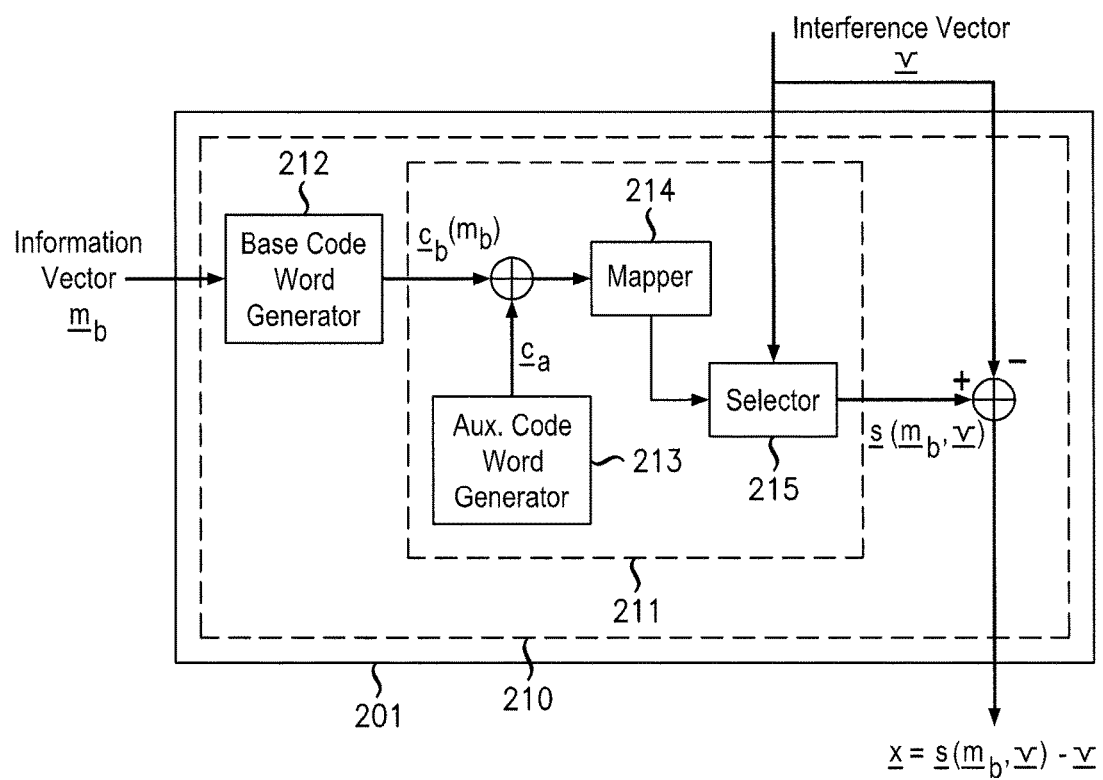
FIG. 2 depicts a general encoding device for implementing a process for reducing interference signal effect, according to an example embodiment.
Figure 3:
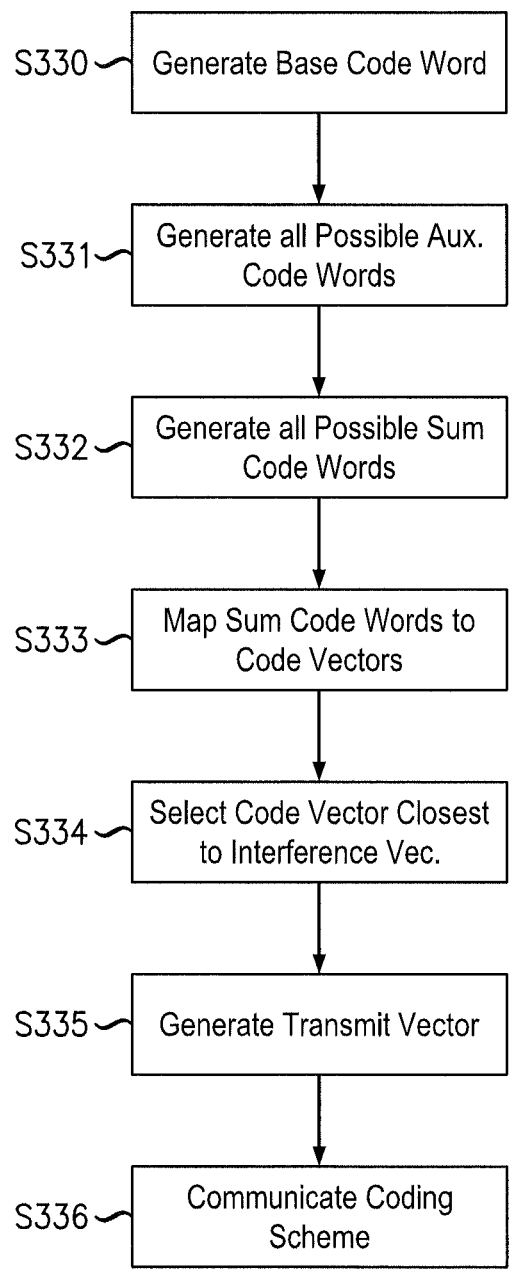
FIG. 3 describes a general method for reducing interference signal effect using the general encoding device of FIG. 2, according to an example embodiment.

FIG. 2 depicts a general encoding device for implementing a process for reducing interference signal effect, according to an example embodiment. The encoding device 201 includes a processor 210, which may be programmed to incorporate a constrained decoder module 211, which in turn incorporates a variety of modules including, but not limited to, code word generators, combiners, mappers and selectors. The processor 210, by executing the modules, may carry out a variety of underlying tasks including but not limited to the method for reducing an effect of an interference signal on data transmitted over a communication channel, as described in FIG. 3. FIG. 3 describes a general method for reducing interference signal effect using the general encoding device of FIG. 2, according to an example embodiment.

For reducing an effect of an interference signal on data transmitted over a communication channel, the method may initially include determining a code word based on at least an information vector and an interference vector. The information vector may represent the data being transmitted over the communication channel and the interference vector may represent the interference signal. Hereinafter, a general process for determining the code word by the processor 210 is described.

At S330, the processor 210, using the base code word generator 212, generates a base code word associated with an information vector, $m_b$, that may represent data to be transmitted over the network. The processor 210 obtains the base code word as follows. Let information vectors such as $m_b$, be binary vectors of length K and all code words be binary vectors of length N. The base code word associated with the information vector $m_b$ is denoted by $c_b(m_b)$, which is a unique vector of length N associated with the information vector $m_b$. Assuming a coding scheme based on a linear block code, the mapping between $m_b$ and $c_b(m_b)$ is given by $$c_b(m_b)=m_b G_b,$$

where $G_b$ is, any presently known or to be developed K×N generator matrix of a base code. The K-dimensional subspace spanned by base code words is called the base subspace and is denoted by $C_b$.

At S331, the processor 210, using the auxiliary code word generator 213, generates all possible auxiliary code words as follows. Let $c_a$ be a binary vector of length N that belongs to a set of auxiliary code words $C_a$, which is a J-dimensional subspace of the space spanned by binary vectors of length N. $C_a$ can be written as $$C_a=\{m_a G_a : m_a \in \{1,0\}^J\},$$

where $G_a$ is a J×N binary matrix of rank J and $\{1, 0\}^J$ represents the set of all binary J-tuples. In one example embodiment, a sum of the values of K and J may not exceed the value of N. The matrix $G_a$ may be referred to as the generator matrix for the auxiliary code. The sub-space $C_a$ contains $2^J$ binary vectors of length N, whose members are denoted by $c_a$ and referred to as auxiliary code words. Thus, there are $2^J$ possible auxiliary code words (The J-dimensional binary vectors $m_a$ may be referred to as auxiliary vectors). Since the auxiliary code words are fixed, they may be computed once and stored for all future uses to reduce recurrent computation.

At S332, the processor 210 generates all possible sum code words $c(m_b)$, which may also be simply referred to as code words associated with the information vector $m_b$. The processor 210 may determine a sum code word by adding the base code word $c_b(m_b)$ to an auxiliary code word $c_a$. Since there are $2^J$ possible auxiliary code words, it follows that there are $2^J$ possible sum code words associated with the given information vector $m_b$.

In order to avoid potential ambiguity in decoding sum codes, the sets of code words associated with different information vectors may be mutually exclusive. That is, if $m_{b1}$ and $m_{b2}$ are two distinct information vectors, then $C(m_{b1})$ and $C(m_{b2})$, the sets of code words respectively associated with them, have no code words in common. In this case, no non-null vector belonging to the auxiliary subspace $C_a$ belongs to the base subspace $C_b$. This condition may be referred to as the non-ambiguity condition. Therefore, sum codes are selected to satisfy this non-ambiguity condition. A sum code satisfying this non-ambiguity condition also has the property that its code words (of the form $c_b(m_b)+c_a$) span a J+K-dimensional subspace within the space of length-N binary vectors. For purposes of discussion, code words belonging to sum codes are assumed, throughout the rest of this disclosure, to satisfy the non-ambiguity condition.

At step S333, using a mapper 214, the processor 210 maps all possible sum code words associated with the information vector $m_b$ to code vectors by mapping entries within the sum code words to a sequence of signal points in a signal constellation.

At step S334, the processor 210 selects, from all code vectors generated at S333, the code vector that is closest to the interference vector v. The selected code vector is denoted by $s(m_b,v)$.

At step S335, the processor 210 generates a transmit vector x based on the selected code vector $s(m_b,v)$ and the interference vector v. In one example embodiment of the present invention, the transmit vector x is equal to the difference between the selected code vector $s(m_b,v)$ and the interference vector v. (e.g., $x=s(m_b,v)-v$). The transmit vector x is transmitted to the receiving device 104 over the communication channel 103.

In one example embodiment, at S336, the processor 210 transmits the encoding scheme used in determining the transmit vector is, to the receiving device 104.

The method described above is a general method for constructing sum-code-based schemes for combating interference using any linear block code. The method of selecting the code vector for a given information vector involves searching code words under the constraint that they be composed of a sum of the base code word associated with the information vector and an auxiliary code word. As a result, the blocks involved in the selection of the code vector may be collectively looked upon as a constrained decoder 211. In a general sum-code-based scheme, such as the one described above, the steps of constructing all possible code vectors associated with an information vector and selecting one that is closest to the interference vector can be highly complex or time-consuming. Hereinafter, a process for reducing an effect of an interference signal on data transmitted over a communication channel, with reference to FIGS. 4 and 5, will be described.

In one example embodiment, a generated sum code, as will be described below, is a comb-combined sum code. Comb-combined sum codes, when based on linear block codes that have good distance properties, provide a convenient and effective means to implement schemes for combating interference. For example, fixed-length code words associated with convolutional codes with certain generator polynomials exhibit good distance properties for arbitrary coding lengths. Comb-combined sum codes based on such codes provide a means to exploit this property to construct a coding scheme that can be used to combat known interference via dirty paper coding. Comb-combined sum codes may be based on any linear block codes including, but not limited to, convolutional codes (conventional or tail-biting) with fixed block lengths, LDPC codes, Turbo codes, etc.

Figure 6:
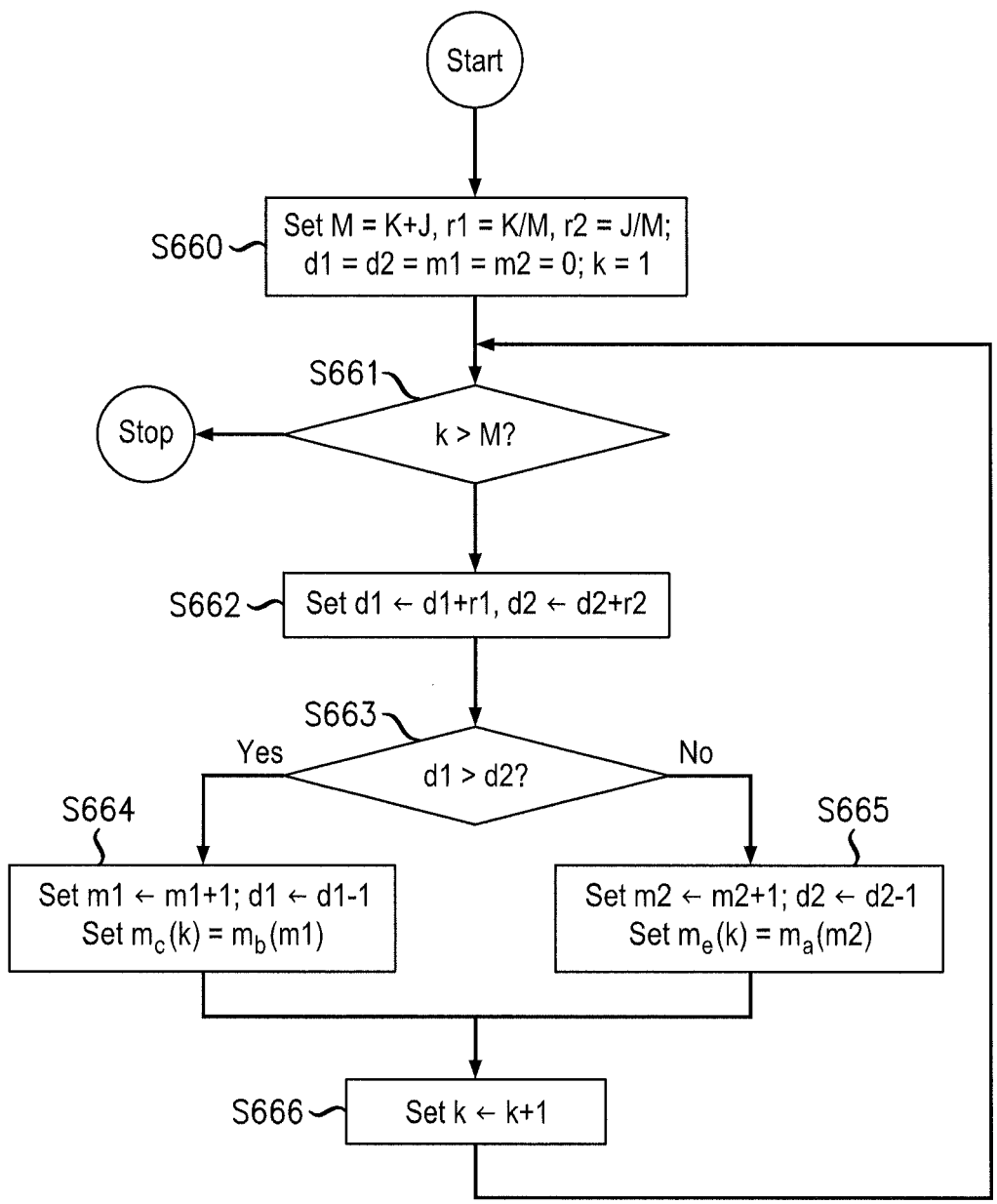
FIG. 6 illustrates an algorithm for comb-combining two vectors, according to an example embodiment.

FIG. 6 illustrates an algorithm for comb-combining two vectors, according to an example embodiment. The two vectors may be an information vector and an auxiliary vector. Let $m_b$ be a length-K information vector to be transmitted, which is referred to as a base information vector. Let $m_a$ be a length-J bit sequence, which is referred to as an auxiliary information vector, or simply, an auxiliary vector. In this example embodiment, the sequences $m_b$ and $m_a$ are combined to obtain a length-(K+J) vector $m_c$ such that the bits belonging to $m_b$ and $m_a$ are uniformly spread over the length of the sequence $m_c$. Code words belonging to the comb-combined sum code are length-N binary vectors obtained by multiplying the vector $m_c$ by G, the (K+J)×N generator matrix associated with a (N,K+J) linear block code. Hereinafter an exemplary process according to which the vector $m_c$ is determined from the base information vector $m_b$ and the auxiliary information vector $m_a$ is explained with reference to FIG. 6.

At S660, the processor 210 sets initial values for a plurality of variables. In one example embodiment, M is set to be equal to K+J, r1 is set to be equal to K/M, r2 is set to be equal to J/M, d1, d2, m1 and m2 are all set to be equal to 0, and k is set to be equal to 1. At S661, the processor 210 compares the values of k and M. If the value of k is greater than M, the process stops. However, if the value of k is less than M, the processor 210, at S662, sets d1 to be equal to d1+r1 and d2 to be equal to d2+r2. At S663, the processor 210 compares the values of d1 and d2. If the processor 210 determines that d1 is greater than d2, then the processor 210, at S664, increments m1 by 1 and decrements d1 by 1. Furthermore, at S664, the processor sets the $k^{th}$ value of the vector $m_c$ to $m1^{st}$ value of the information vector $m_b$ ($m_c(k)=m_b(m1)$). Thereafter, at S666, the processor 210 increments the value of k by 1 and the process returns back to S661.

However, if at S663, the processor 210 determines that d2 is greater than d1, at S665, the processor 210 increments m2 by 1 and decrements d2 by 1. The processor 210 further sets, at S665, the $k^{th}$ value of the vector $m_c$ to $m2^{nd}$ value of the auxiliary vector $m_a$ ($m_c(k)=m_a(m2)$). Thereafter, at S666, the processor 210 increments the value of K by 1 and the process returns back to S661.

It is easy to see that a coding scheme in which code vectors are constructed by multiplying the combined vector $m_c$ by the generator matrix G is a sum code in accordance with the above definition of a sum code. Specifically in the just described construction, base code words are those length-N binary vectors that can be written in the form $m_c$ G where the bits corresponding to the auxiliary information vector are zeros in the vector $m_c$. Similarly, auxiliary code words are those vectors of the form $m_c$ G where the bits corresponding to the base information vector are zeros in the vector $m_c$.

An example embodiment illustrating the construction of comb-combined sum codes based on a convolutional code operating in a tail-biting mode is described hereinafter. As pointed out earlier, for a general sum code, the process of selecting the code vector based on a given information vector and interference vector can be rather time-consuming. This process, embodied by the constrained decoder 211, can be carried out efficiently for certain coding schemes. For example, convolutional codes provide a coding scheme to implement the process of selecting the code vector efficiently.

In this example embodiment, it is assumed that L/2 information bits are to be transmitted over L channel uses and that the number of auxiliary bits to be used over the L channel uses is 2.5L. (Thus, K=L/2 and J=2.5L.) The number of auxiliary bits needed per channel use depends on the relative strengths of the interference symbols and the desired transmit energy. The higher the level of interference, the more auxiliary bits are needed per channel use. In this example embodiment, it is assumed that the interference level is high enough to require 2.5 auxiliary bits per channel use. Therefore, the processor 210 receives a base information vector $m_b$ of length L/2 bits and constructs an auxiliary information vector $m_a$ of length 2.5L bits. Vector $m_b$ contains the L/2 information bits to be transmitted to the receiving end whereas the vector $m_a$ contains 2.5L zero bits. The base and auxiliary information vectors are then comb-combined, according to the method of FIG. 6 described above, to produce the information vector $m_c$ (of length 3L bits). The contents of the vector mc appear as shown below $$m_c = [xxxb_1xxxxxb_2xxxxxb_3xx \ldots xxb_{L/2}xx].$$

where $b_1, b_2, b_3, \ldots b_{L/2}$ are the L/2 base information bits and the x's mark the zero auxiliary information bits.

Figure 7:
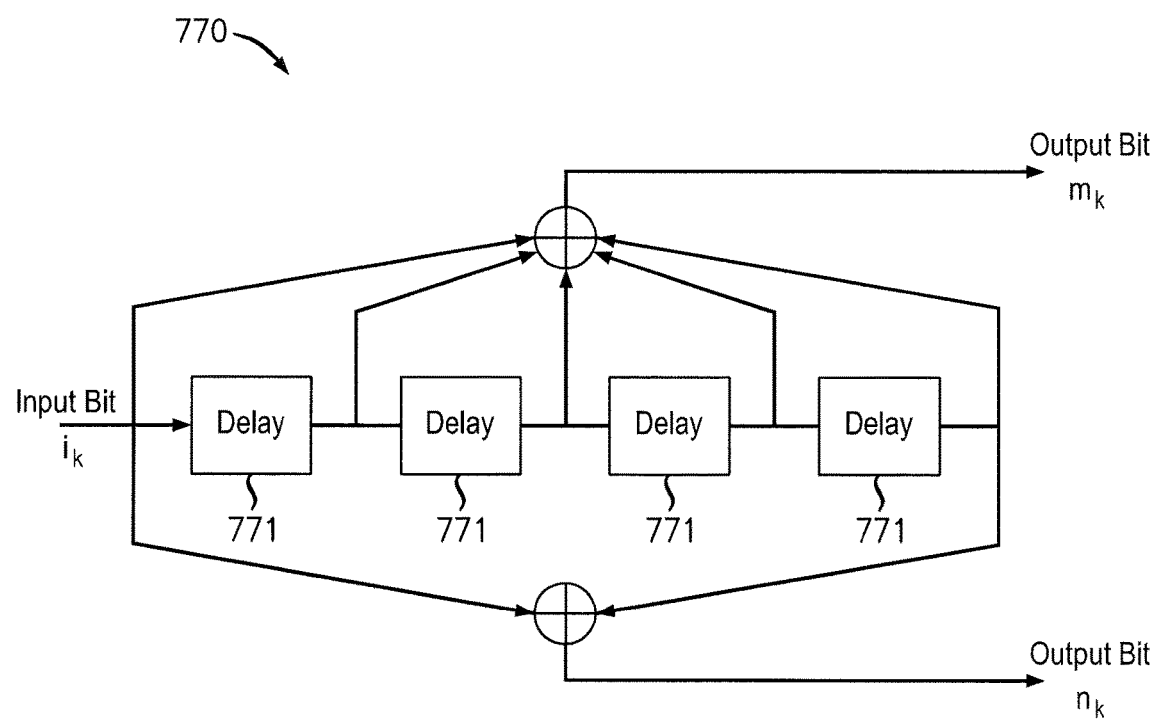
FIG. 7 illustrates a standard encoder for a communication system employing a convolutional code, according to an example embodiment.

FIG. 7 illustrates a standard encoder for a conventional code, according to an example embodiment. For example, a communication system 770 employing a rate ½ convolutional code with 4-bit encoder states. In a communication system employing the "tail-biting" version of the convolutional code, such as the system 770 of FIG. 7, the encoding operation begins by placing the last four bits to be encoded into the shift register shown in FIG. 7 and then inputting the bits to be encoded, which may be referred to also as input bits, one by one to the shift register. The shift register may include delay devices 771 that may hold a plurality of previously inputted bits (e.g., 4 bits), thus making up the state of the encoder. Each arriving input bit $i_k$, in combination with the four bits in the shift register, gives rise to two output bits which $m_k$ and $n_k$. Output bits produced in this manner constitute the code word, which is mapped into a code vector, and then transmitted over the communication channel.

Figure 4:
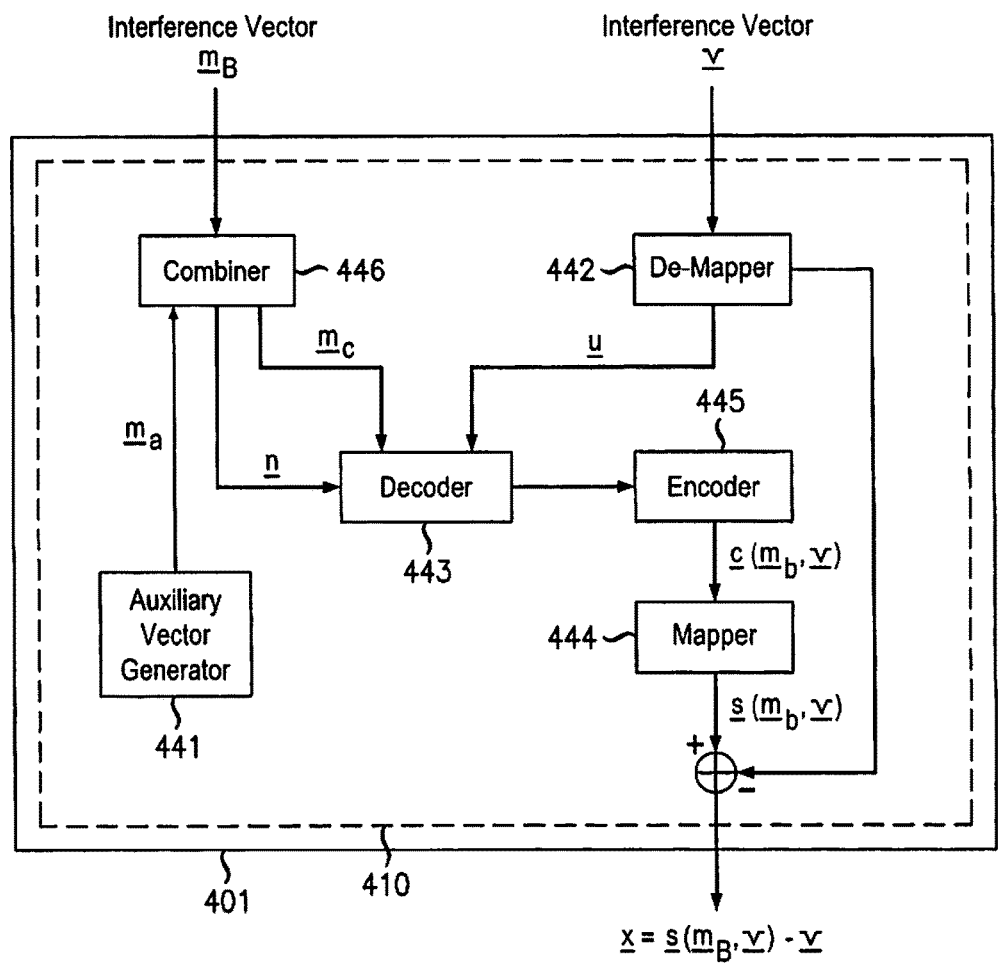
FIG. 4 depicts an encoding device for implementing a method for reducing interference signal effect, according to an example embodiment.
Figure 5:
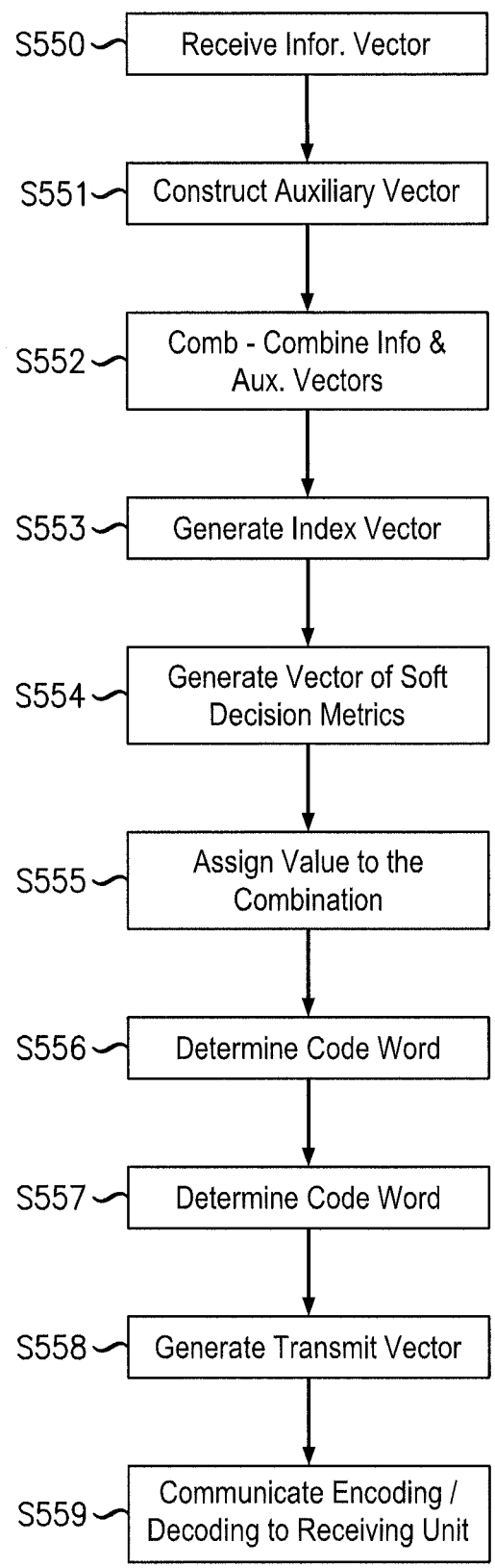
FIG. 5 describes a method for reducing interference signal effect using the encoding device of FIG. 4, according to an example embodiment.

Referring to FIGS. 4 and 5, a process for determining a code word based on at least an information vector and an interference vector, determining a code vector based on the determined code word and generating a transmit vector based on the code vector is described. FIG. 4 depicts an encoding device for implementing a method for reducing interference signal effect, according to an example embodiment. FIG. 5 describes a method for reducing interference signal effect using the encoding device of FIG. 4, according to an example embodiment.

Referring to FIG. 4, the processor 410 of the encoding device 401, at step S550 receives the base information vector $m_b$, representing the data to be transmitted, the base information vector $m_b$ may be of length L/2.

At step S551, the processor 410 constructs the length-2.5L auxiliary information vector $m_a$ with zeroed-out entries, as described above. The processor 410 may construct the auxiliary vector $m_a$ by executing the auxiliary vector generator 441.

At step S552, the processor 410 the processor 410, using the method described above with respect to FIG. 6, comb-combines the vectors $m_b$ and $m_a$ to produce the combined vector $m_c$. The processor 410 may com-combine the vectors $m_b$ and $m_a$ by executing the comb-combiner 446.

At S553, the processor 410, generates an index vector, $n=[n_1 n_2 \ldots n_{3L}]$, such that, for i=1, 2, ..., 3L, if the $i^{th}$ entry of $m_c$ is a base information bit, $n_i$ equals zero; otherwise (e.g., if the $i^{th}$ entry of $m_c$ is an auxiliary bit, $n_i=1$). The processor 410 may generate the auxiliary vector by executing the auxiliary generator 441. The index vector may be utilized by the processor 410, to determine which entries of the combined vector $m_c$ correspond to the auxiliary information vector so that the entries corresponding to the auxiliary information vector can be replaced with the output of the constrained decoder 443, as will be further described below.

Thereafter, the processor 410, via a de-mapper 442, generates a vector of soft decision metrics (S554). Hereinafter, the process of generating the vector of soft decision metrics is described.

Assuming that the convolutional code being used is the one whose standard encoder is illustrated in FIG. 7, the code rate for the encoding scheme is ½. Since the combined vector $m_c$, which is to be ultimately encoded to generate code words, is of length 3L, The length of the code words will be 6L bits. Since the 6L bits are to be transmitted over L channel uses, the signal constellation to be used for transmission must have 64 signal points. Therefore, the processor 410 feeds the interference sequence $v=[v_1 v_2 \ldots v_L]$ to the de-mapper 412 to construct a vector of soft decision metrics u of length 6L- The mapping of groups of 6 bits to a signal point is assumed to be done according to a method such as Gray coding. The de-mapper 442 produces 6 soft decision metrics for each symbol belonging to the interference sequence v. The de-mapping function, according to one example embodiment, is as follows. Let $\lambda_0, \lambda_1, .$ ..., $\lambda_{63}$ be the 64 PAM levels in the signal constellation. In general, the signal constellation is associated any one of, but not limited to, a Pulse Amplitude Modulation (PAM) system and a Quadrature Amplitude Modulation (QAM) system. However, for purposes of describing the example embodiments, a signal constellation associated a PAM system is assumed. The levels of the signal constellation are set such that the average per-symbol energy is equal to the sum of the per-symbol interference energy and the desired transmit energy with some additional power amplification to account for non-ideal performance.

Referring back to the de-mapping function, the 6-bit segments 000000, 000001, ..., 111111 are mapped into these PAM levels according to the Gray Code. Then for each interference symbol $v_k$ at its input, the de-mapper 442 produces a vector $u_k=[u_{k1}\ u_{k2}\ \ldots\ u_{k6}]$ as follows: For j=1, 2, ..., 6, it looks for the PAM level $\lambda_{zero}$ that is closest to $v_k$ among all the PAM levels whose associated bit-sequence has a 0 in the jth position. Similarly, it looks for the PAM level $\lambda_{one}$ that is closest to $v_k$ among all the PAM levels whose associated bit-sequence has a 1 in the jth position. Once the processor 410, via the de-mapper 442, has found the levels $\lambda_{zero}$ and $\lambda_{one}$, the processor 410 calculates the soft decision metric $u_{kj}=(v_k-\lambda_{one})^2-(v_k-\lambda_{zero})^2$. In this manner, the processor 410 generates length-6 vectors, $u_k$, for all symbols associated with the interference vector v. These are concatenated to produce a vector u of length 6L, as depicted at the output of the de-mapper module 442 in FIG. 4.

Figure 8:
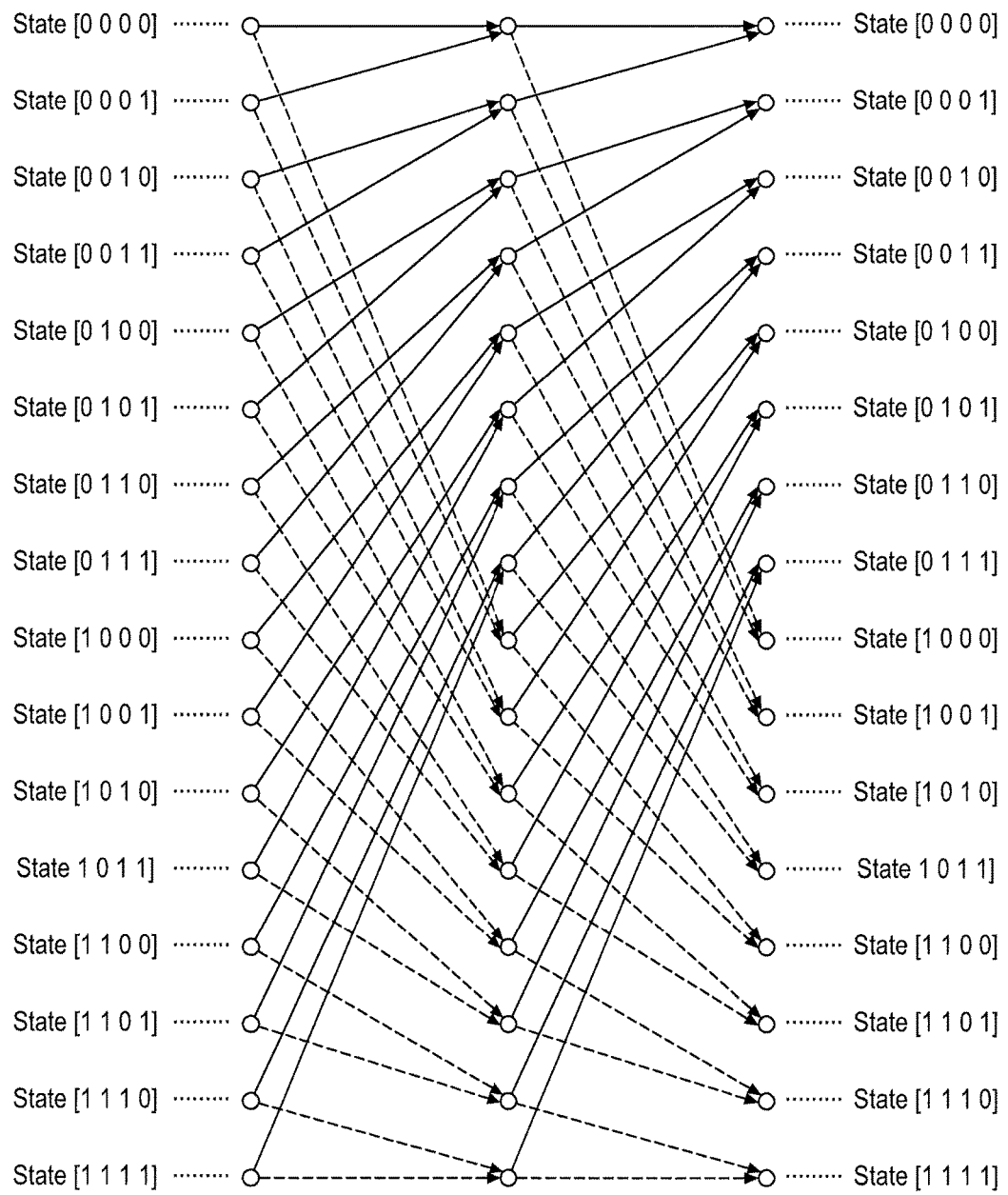
FIG. 8 illustrates a state transition map showing transitions of the encoder states of a communication system employing a convolutional code, according to an example embodiment.

At S555, the processor 410 assigns values to the entries of the combined vector $m_c$ that correspond to the auxiliary information vector $m_a$. The processor 410 assigns values to the entries of the combined vector $m_c$ that correspond to the auxiliary information vector $m_a$ using a constrained decoder 443. In the present example embodiment where the encoding scheme is based on a convolutional code, the constrained decoder 443 may be a constrained Viterbi decoder. The Viterbi decoder is referred to as a constrained Viterbi decoder because it is aware of the values that correspond to the base information vector $m_b$. Hereinafter, the process of assigning values to the entries of the combined vector $m_c$ that correspond to the auxiliary information vector is described. The processor 410 feeds the soft decision vector u, the comb-combined information vector $m_c$ and the index vector it to the constrained decoder 443, which is a constrained Viterbi decoder in the present example embodiment. Referring back to FIG. 7, at step k where the $k^{th}$ bit $i_k$ is at the input, the previous four bits $[i_{k-1}\ i_{k-2}\ i_{k-3}\ i_{k-4}]$ determine the encoder state. Since, in general, each input bit can be 0 or 1, there are two possible transitions out of each state; similarly, there are two possible transitions into each state. FIG. 8 illustrates a state transition map showing transitions of the encoder states of a communication system employing a convolutional code, according to an example embodiment.

When a state transition occurs out of a state due to the arrival of an input bit, two output bits are produced. The values of these output bits in combination with the corresponding soft decision metrics determine the branch metric associated with the state transition. A sequence of encoder state transitions caused by a sequence of input bits is represented by a path in the trellis, and the metric associated with the path, called path metric, is simply the sum of the branch metrics associated with the state transitions constituting the path. The Viterbi decoder, in general, determines the sequence of encoder states (e.g., path) with the minimum path metric.

As explained above, in the present example embodiment, the (Viterbi) decoder 443 knows the information vector and thus is configured to determine the code vector associated with the known information vector such that the code vector minimizes the distance from the interference vector. The known entries of the information vector provide a constraint on the operation of the (Viterbi) decoder 443, hence turning the (Viterbi) decoder 443 into a constrained (Viterbi) decoder. Accordingly, the objective for the processor 410 is to find an encoder state sequence with the minimum path metric among those sequences that are consistent with the state transitions corresponding to the known entries (bits) of the information vector. Hereinafter, a process for imposing this constraint on the decoder 443 is described.

When the decoder 443 updates path metrics at the $k^{th}$ step (e.g. when the state transitions corresponding to the $k^{th}$ input bit are being considered), if the $k^{th}$ input bit corresponds to a base information bit, for each state the decoder 443 considers the unique transition (determined by the value of the input bit) that is possible out of that state. On the other hand, if the $k^{th}$ input bit is an auxiliary bit, which is unknown at this stage, the decoder 443 considers both possible transitions out of each state—one corresponding to the input bit being 0 and the other to the input bit being 1. Other than this constraint, the decoder 443 is operated in a normal known manner to determine the sequence of encoder states with the minimum path metric.

An encoder state sequence uniquely determines the associated comb-combined bit sequence (e.g., the values associated with the entries of the combined vector $m_c$) as well as the output bit sequence. Thus, the encoder state sequence with the minimum path metric uniquely determines the output bit sequence, (e.g., the code word, such that the code vector associated with it is closest to the sequence of interference symbols (v) that was fed to the input of the encoding device. Thus, at the end of step S445, the decoder 443 outputs the combined vector $m_c^o$ with correct values assigned to all of its entries including those that correspond to the auxiliary information vector.

At step S556, the processor 410, via standard encoder 415 (e.g., a standard convolutional encoder such as the one shown schematically in FIG. 7) determines the code word associated with the information vector $m_b$ and the interference vector v. The processor 410 may determine the code word by determining a sum of a base code word associated with the information vector and an auxiliary code word. The processor 410 may determine the sum by encoding the combined vector $m_c^o$ using the (standard) encoder 445. The code word maps to a code vector that lies closest to the interference vector v. We denote this code word by $c(m_b,v)$.

Furthermore in determining the code word, the processor 410 may identify the auxiliary vector using a constrained decoder that compares a difference between the interference vector and possible code vectors obtainable by mapping the sum of the base code word and the auxiliary code words associated with the possible auxiliary vectors to sequences of signal points.

At S557, the processor 410 may determine a code vector based on the determined code word $c(m_b,v)$. The processor 410 may determine the code vector by mapping entries of the determined code word $c(m_b,v)$ to a sequence of signal points of a signal constellation, using the mapper 444. The mapper 444 may be a known Gray Mapper.

In the present example embodiment, the Gray mapper, takes groups of 6 bits of the code word $c(m_b,v)$ and maps each such group of bits into a PAM level. The result is a sequence of L PAM levels constituting the length-L code vector denoted by $s(m_b,v)$.

Thereafter, the processor 410 generates a transmit vector based on the code vector and the interference vector. The processor 410 generates the transmit vector by, for example, subtracting the interference sequence v from $s(m_b,v)$ to generate a transmit signal (S558). The transmit vector may be a length-L transmit vector $x=s(m_b,v)-v$, which is then transmitted over the communication channel over L channel uses.

Finally, the processor 410 may communicate the schemes according to which the processor 410 carries out the encoding process, as described above, to the receiving device (S559). The processor 410 may transmit the encoding schemes to the receiving device via a separate control channel. Furthermore, the transmission may be before carried out prior to the actual transmission of the transmit vector over the communication channel 103.

Figure 9:
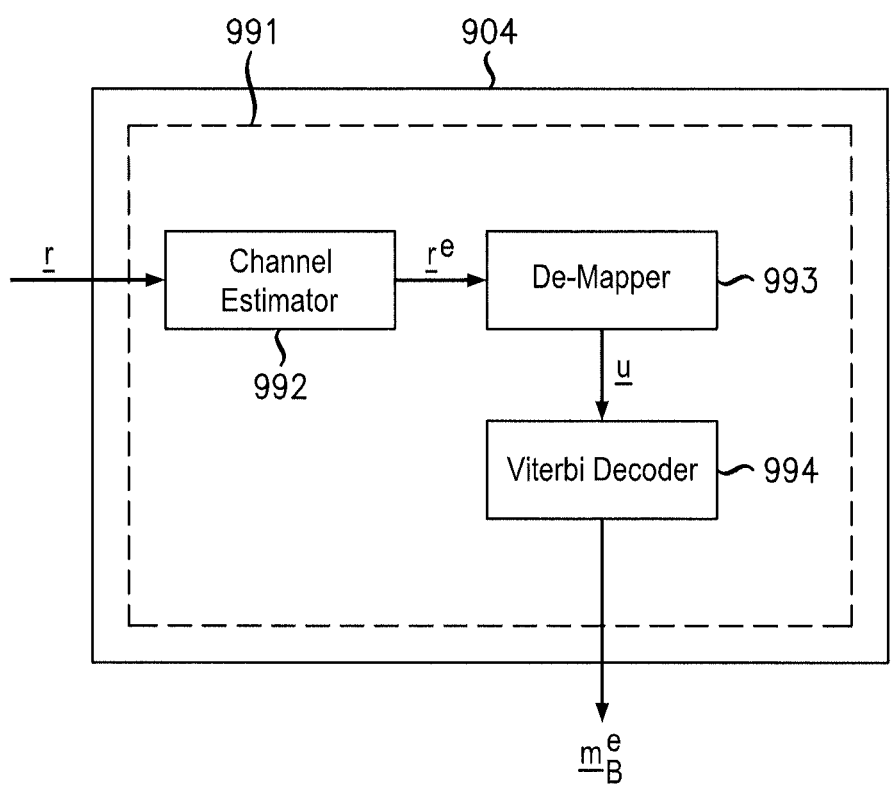
FIG. 9 depicts a receiving device for receiving a signal communicated over a communication channel, according to an example embodiment.

FIG. 9 depicts a receiving device for receiving a signal communicated over a communication channel, according to an example embodiment. The receiving device 904 includes a processor 991, which may be programmed to incorporate a variety of modules, including but not limited to, a channel estimator 992, a de-mapper 993 and a decoder 994 for carrying out underlying tasks including but not limited to the process described in FIG. 10. Hereinafter, the functionalities of the receiving device 904 and the modules incorporated therein will be described with respect to the process illustrated in FIG. 10.

Figure 10:
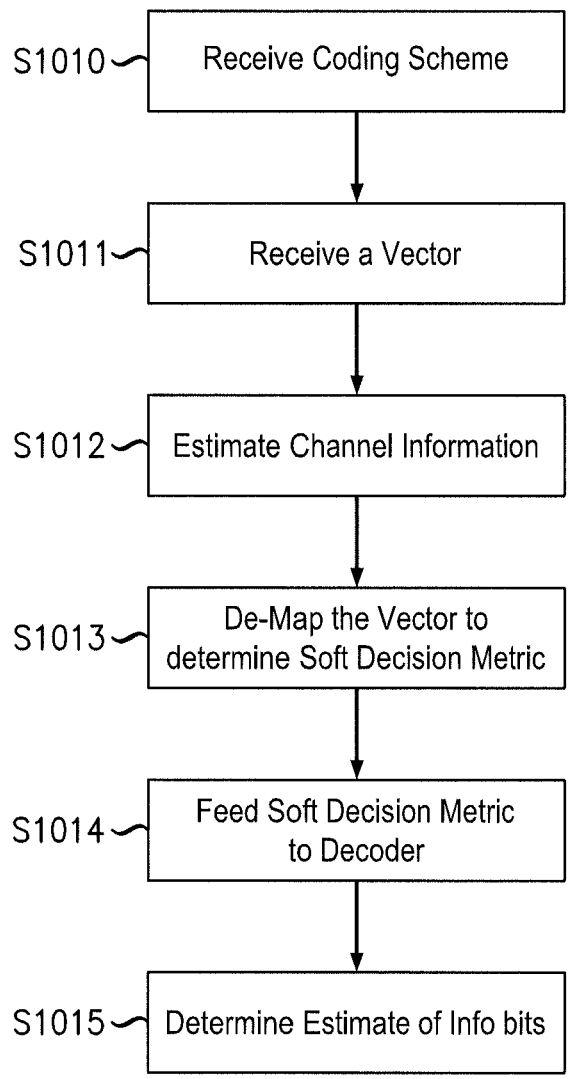
FIG. 10 describes a method for estimating an information vector transmitted over a communication channel, at a receiving device, according to an example embodiment.

FIG. 10 describes a method for estimating an information vector transmitted over a communication channel, at a receiving device, according to an example embodiment. At S1010, the processor 991 receives the coding scheme used by the encoding device 201 (or encoding device 401) via a separate control channel. As described above, the decoder is aware of the coding scheme including the number of signal levels used in the construction of transmit vector. Such coding scheme may be communicated to the receiving device by the processor 210 of the encoding device 201 (or processor 410 of the encoding device 401).

At S1011, the receiving device 904 receives a signal transmitted to the receiving device 904 over the communication channel 103. The signal may be a vector associated with a code vector transmitted over the communication channel, the code vector being based on an information vector and an interference vector, the information vector representing the data, the interference vector representing an interference signal affecting the data communicated over the communication channel.

At S1012, the processor 991, via the channel estimator 992, estimates the channel information. Estimating channel information may describe how a signal propagates from the transmitter to the receiver and represents the combined effect of, for example, scattering, fading, and power decay with distance. The channel information may be estimated using any known method.

In one example embodiment, the received vector $r=s(m_b,v)+n$, where $s(m_b,v)$ is the code vector associated with the base information bits that is closest to the interference vector v and n is the noise vector. The task of the receiver is to find a code vector that is closest to the received vector. Since each code vector is associated with a unique base information vector, finding the code vector that is closest to the received vector provides a maximum likelihood estimate of the base information bits.

In order to determine the code vector, the processor 991, then determines from among all possible code vectors, the code vector such that the code vector is the closest to the received vector compared to all possible code vectors, the determined code vector representing an estimate of the information vector. Hereinafter, the process of determining the code vector is described for the example embodiment wherein the encoding scheme is based on a convolutional code.

The processor 991 de-maps the received vector r, via a de-mapper 993, to determine a vector u(r) of soft decision metrics (S1013). This de-mapper 993 may be identical to the one used by the encoder to produce soft decision metrics from the interference vector v. The length of the soft decision metric vector in both the encoder as well as the decoder equals the number of bits in a code word (e.g., 6L in one example embodiment).

The processor 991 may then feed the soft decision metric vector u(r) to a decoder 994 to determine the code vector (S1014). The decoder 994 may be a standard (unconstrained) Viterbi decoder. Thereafter, the processor 991, via the decoder 994, may determine the most likely sequence of encoder states (S1015). Since a sequence of encoder states uniquely deter nines the associated code vector as well as the combined vector ($m_c$) which was encoded and then mapped to produce the code vector, the decoder 994 can be said to produce a maximum likelihood estimate of the bits within the combined vector $m_c$. Those bits within $m_c$ which correspond to base information bits constitute the desired estimate of the information bits that were transmitted by the transmitting end using the comb-combined sum code based coding system.

Variations of the example embodiments are not to be regarded as a departure from the spirit and scope of the example embodiments, and all such variations as would be apparent to one skilled in the art are intended to be included within the scope of this disclosure.

What is claimed:

1. A method for reducing an effect of an interference signal on data transmitted over a communication channel, comprising:
    determining, by a processor, a plurality of auxiliary vectors;
    determining, by the processor, a plurality of code words, each of the plurality of code words representing a combination of a base code word associated with an information vector and one of a plurality of auxiliary code words, each of the plurality of auxiliary code words being associated with a different one of the plurality of auxiliary vectors the information vector representing the data;
    determining, by the processor, a code vector based on one of the plurality of code words and an interference vector, the interference vector representing the interference signal, a difference between the interference vector and the code vector being less than a difference between the interference vector and any code vector determined based on other ones of the plurality of code words;
    generating, by the processor, a transmit vector based on the code vector and the interference vector; and
    transmitting the generated transmit vector over the communication channel toward a receiving device.

2. The method of claim 1, wherein the determining the code vector comprises:
    mapping entries of the code word to a sequence of signal points of a signal constellation.

3. The method of claim 1, further comprising:
 determining, from among the plurality of auxiliary vectors, the one of the plurality of auxiliary vectors such that when the combination representing a sum of the base code word and one of the plurality of auxiliary code words corresponding to the one of the plurality of auxiliary code vectors is mapped to the sequence of signal points, the difference between the interference vector and the resulting code vector is less than the difference between the interference vector and any other code vector resulting from mapping of any of remaining ones of the plurality of sums to sequences of signal points.

4. The method of claim 1, wherein the generating the transmit vector further comprises:
 subtracting the interference vector from the code vector.

5. The method of claim 2, wherein the signal constellation is associated with at least one of a Pulse Amplitude Modulation (PAM) system and a Quadrature Amplitude Modulation (QAM) system.

6. The method of claim 2, where the mapping is carried out according to Gray Coding.

7. The method of claim 3, wherein the base code word and the plurality of auxiliary code words are code words belonging to a linear block code, and
 the determining the code word further comprises:
  identifying the one of the plurality of auxiliary vectors using a constrained decoder that compares a difference between the interference vector and code vectors resulting from mapping the plurality of sums to the sequences of signal points.

8. The method of claim 7, wherein the linear block code is a convolutional code, and
 the constrained decoder is a constrained Viterbi decoder.

9. A method for estimating encoded data received over a communication channel, comprising:
 receiving, via a separate control channel that is different from the communication channel, information related to an encoding scheme used for encoding the data, the received information including at least an indication of a number of signal points of a signal constellation used in constructing the transmitted signal;
 receiving, at a processor, a signal that is a vector associated with a code vector transmitted over the communication channel, the code vector being based on a code word an information vector and an interference vector, the information vector representing the data, the interference vector representing an interference signal affecting the data communicated over the communication channel;
 extracting a vector of metrics associated with the interference vector from the received signal, the vector of metrics having been used for encoding the data; and
 determining, by the processor and based on the vector of metrics, the code vector from among possible code vectors, such that the code vector is the closest to the received vector compared to possible code vectors, the determined code vector representing an estimate of the information vector.

10. The method of claim 9, wherein the determining the code vector comprises:
 de-mapping the received vector to determine a vector of soft decision metrics;
 feeding the vector of soft decision metrics into an unconstrained decoder to determine the code vector.

11. The method of claim 10, wherein the unconstrained decoder is a standard Viterbi decoder.

12. An encoding device comprising a processor for reducing an effect of an interference signal on data transmitted over a communication channel, the processor configured to,
 determine a plurality of auxiliary vectors;
 determine a plurality of code words, each of the plurality of code words representing a combination of a base code word associated with an information vector and one of a plurality of auxiliary code words, each of the plurality of auxiliary code words being associated with a different one of the plurality of auxiliary vectors the information vector representing the data;
 determine a code vector based on one of the plurality of code words and an interference vector, the interference vector representing the interference signal, a difference between the interference vector and the code vector being less than a difference between the interference vector and any code vector determined based on other ones of the plurality of code words;
 generate a transmit vector based on the code vector and the interference vector; and
 transmit the generated transmit vector over the communication channel toward a receiving device.

13. The encoding device of claim 12, wherein the processor is further configured to determine the code vector by,
 mapping entries of the code word to a sequence of signal points within a signal constellation.

14. The encoding device of claim 12, wherein the processor is further configured to,
 determine, from among the plurality of auxiliary vectors, the one of the plurality of auxiliary vectors such that when the combination representing a sum of the base code word and one of the plurality of auxiliary code words corresponding to the one of the plurality of auxiliary code vectors is mapped to the sequence of signal points, the difference between the interference vector and the resulting code vector is less than the difference between the interference vector and any other code vector resulting from mapping of any of remaining ones of the plurality of sums to sequences of signal points.

15. The encoding device of claim 13, wherein the signal constellation is associated with at least one of a Pulse Amplitude Modulation (PAM) system and a Quadrature Amplitude Modulation (QAM) system.

16. The encoding device of claim 14, wherein
 the base code word and the plurality of auxiliary code words are code words belonging to a linear block code, and
 the processor is further configured to determine the code word by identifying the one of the plurality of auxiliary vectors using a constrained decoder that compares a difference between the interference vector and code vectors resulting from mapping the plurality of sums to the sequences of signal points.

17. The encoding device of claim 16, wherein the linear block code is a convolutional code, and
 the constrained decoder is a constrained Viterbi decoder.

* * * * *